United States Patent [19]

Castelletti et al.

[11] 4,038,773
[45] Aug. 2, 1977

[54] FISHING LURE

[76] Inventors: Robert Castelletti; George Spector, both of c/o George Spector, 3615 Woolworth Bldg., 233 Broadway, New York, N.Y. 10007

[21] Appl. No.: 669,232

[22] Filed: Mar. 22, 1976

[51] Int. Cl.² ............................................. A01K 85/00
[52] U.S. Cl. .................................... 43/26.2; 43/42.04; 43/42.31
[58] Field of Search ............... 43/26.2, 26.1, 42.31, 43/42.02, 42.26, 35, 42.04, 42.35; 46/118, 124, 92

[56] References Cited

U.S. PATENT DOCUMENTS

| 1,588,690 | 6/1926 | Babbitt | 43/35 |
| 2,218,280 | 10/1940 | Deering | 43/42.35 |
| 2,543,464 | 2/1951 | McPherson | 43/26.2 |
| 2,599,128 | 6/1952 | Roberts | 43/26.2 |
| 2,636,316 | 4/1953 | Solovioff | 43/26.2 |
| 3,000,130 | 9/1961 | Pankuch | 43/42.31 |
| 3,105,317 | 10/1963 | Fox | 43/26.2 |

Primary Examiner—Warner H. Camp

[57] ABSTRACT

A plug lure attachable to a fishing line which when in contact with water produces ripples and noises simulating live bait to attract fish.

5 Claims, 5 Drawing Figures

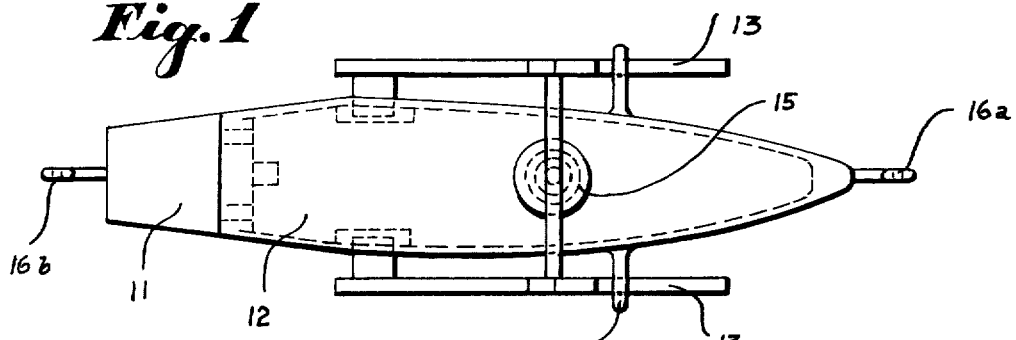
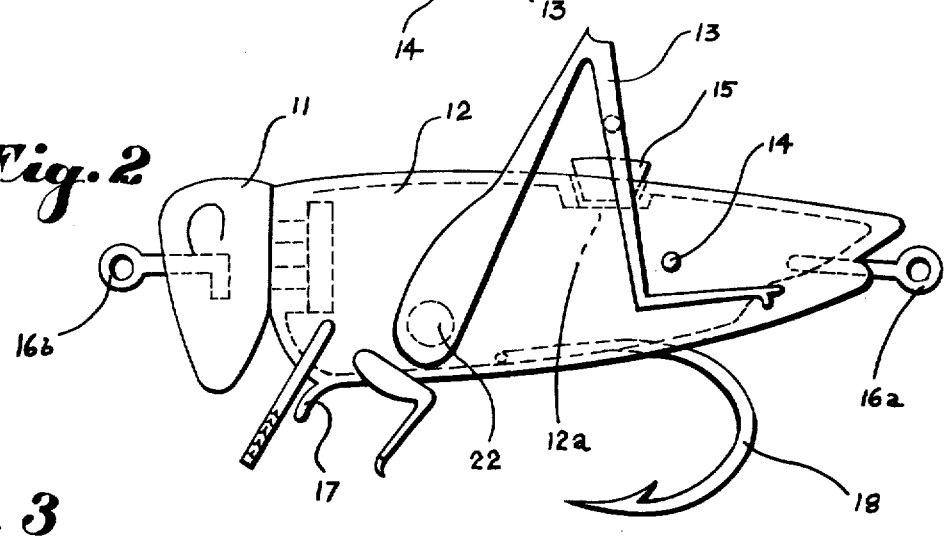
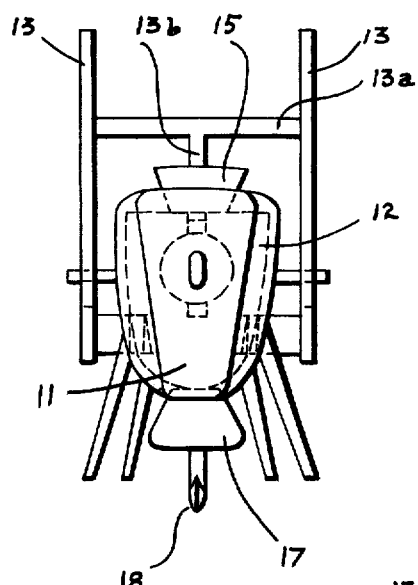
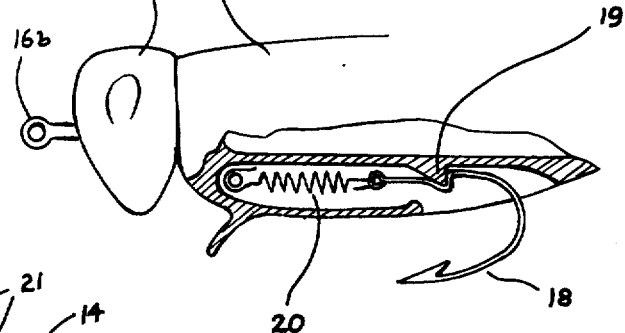
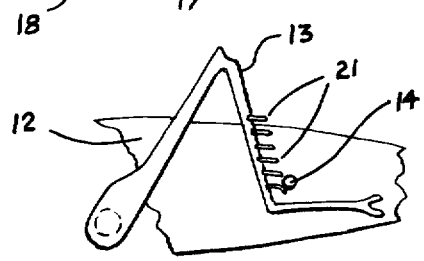

FISHING LURE

SUMMARY OF THE INVENTION

It is common practice to use various kinds of baits in fishing. Live baits such as worms, grasshoppers, etc., are not always easy to get. Substitute baits can work when they effectively imitate live fish food.

This invention proposes a plug lure simulating the shape, size, color and various movements of a grasshopper on a water surface. These movements are obtained from the combination of the lure with effervescent substances which on contact with water generate a gas. This gas then is utilized for propelling elements of the lure and for producing noises, in such a manner that they simulate live insects, grasshoppers or the like.

BRIEF DESCRIPTION OF THE DRAWINGS

FIG. 1 is a top view of the invention shown in FIG. 2.

FIG. 2 is a side elevation thereof.

FIG. 3 is a front elevation facing the head of the grasshopper-like device.

FIG. 4 is a partial longitudinal section of FIG. 2 to show a modification of the fish hook associated with the device.

FIG. 5 is another modification showing a detail associated with the legs of the grasshopper-like device.

DESCRIPTION OF EMBODIMENTS

The device according to the invention will now be described with reference to FIG. 2.

12 is the main body which is hollow. Attached to it in the fashion of a twist lid is a cap 11 which may have the shape of the head of a grasshopper. 13 are legs on both sides, pivoted on an axle 22. The two legs 13 are linked together by a bridge 13a and also connected to a connecting rod 13b. The latter is fastened to a plastic vent valve 15 which normally seals off a corresponding valve hole 12a in the middle top portion of said body 12. The eyelet 16a is integrally molded into body 12. The eyelet 16b is integrally molded into twist cap 11.

To limit the motion of the hinged legs 13, a stop 14 is provided on each side of body 12.

A platelike extension 17 acts as a fixed diving rudder, causing the lure to submerge when moved forward. Finally, there is a hook 18 which may be of the triple type.

This hook instead of being fixed firmly to the lure may be springloaded and movable. This is shown in FIG. 4. The hook 18 is connected to a tension spring 20. A ledge 19 holds the spring in a tensioned state. Any transversal displacement of the hook will cause the spring to contract and to produce a sharp forward movement of the hook.

In FIG. 5, a modification of the invention is shown in that the legs have hairlike protrusions 21. As these legs are caused to move up and down, a rustling noise is produced by the hairs on the stop extension 14.

In operation, the grasshopper plug lure works as follows:

Before use, the lure is firmly held by the user and the cap 11 is removed therefrom by a simple twisting movement. A prepared quantity of effervescent material is then inserted into the interior of part 12. Thereafter, cap 11 is again put back and locked securly in place by a similar twisting movement. The fishing lure is now fastened to a line by eyelet 16a. When the lure is tossed into the water it will initially submerge. This will cause the freely pivoted legs 13 to move upward relative to the main body 12. Since the vent value 15 is connected to the legs it will also be lifted off its seat. A small quantity of water will be admitted into the interior of the lure.

The lure will then settle in the water with a small amount of water having seeped therein due to the lifting movement of the legs and valve 15. Gas will be generated in the body due to the small amount of water causing an effervescent action resulting in a rapid quivering movement of the lure and legs simulating the movement of a live insect. In addition protrusions 21 and stops 14 will generate noises to attract fish.

When the said alternating movement fades out, it can be re-initiated by imparting on the fishing line a wavery motion which when reaching the lure will tend to push it forward. Because of the deflecting plate 17 this will result into a momentary dive of the lure. After that some water will enter the chamber containing the effervescent material and the whole process described above will repeat itself.

In this way it is possible to keep the lure going without recharging.

While various changes may be made in the detail construction, it is understood that such changes will be within the spirit and scope of the present invention as is defined by the appended claims.

What is claimed is:

1. An insect simulating plug lure attachable to a fishing line for catching fish which comprises:
   a. a hollow body with an aperture for inserting effervescent material into it,
   b. a cap to close that aperture,
   c. leg-like with an aperture for inserting effervescent extensions pivoted on the exterior of said body,
   d. a hook for fish retention, mounted on the body exterior
   e. a link connecting said leg-like extensions with a means communicating with said body interior for transmitting pressure changes in said body resulting from the effervescent material into a movement of the pivoted legs,
   f. a vent opening sealed by said means whereby buoyant upward movement of said extensions causes opening of said vent opening for entry of water.

2. A lure as in claim 1 which also comprises stops protruding from the main body of the lure, and wherein the movement of the leg-like extensions is limited by said stops enabling them to vibrate more rapidly, wherein said cap comprises the head of the insect and the said aperture being the body entrance.

3. A lure as in claim 2 which also comprises the feature of a diving rudder responsive to a forward movement of the lure to reinitiate an intake of water for generation of gas from the effervescent load placed in the lure and the said vent opening being located at the top of the body and wherein said means comprises a valve member mounted in said vent opening.

4. A lure as in claim 1 in which a fish hook is connected to a tension spring and backed up by a narrow retaining ledge provided in the body of the lure, in such a manner as to cause a slight displacement of the hook to release the spring and wherein the leg-like extensions have hair-like extensions made of elastic material, whereby the said extensions rub against stops as they move, to simulate the kind of noise grasshoppers produce with their legs.

5. A lure as in claim 1 wherein said means comprises a valve member mounted in said vent opening, said link comprising a structural connection between the extensions and the valve member whereby upward movement of the extensions causes opening of the valve member.

* * * * *